US012797907B2

(12) United States Patent
Jiménez et al.

(10) Patent No.: US 12,797,907 B2
(45) Date of Patent: Nov. 17, 2026

(54) LUMPS DISCHARGE SYSTEM

(71) Applicant: Braskem S.A., Camaçari (BR)

(72) Inventors: Roberto Osorio Jiménez, São Paulo (BR); Paulo Roberto Ignacio, São Paulo (BR); Tiago Mohr, São Paulo (BR)

(73) Assignee: Braskem S.A., Camacari (BR)

( * ) Notice: Subject to any disclaimer, the term of this patent is extended or adjusted under 35 U.S.C. 154(b) by 0 days.

(21) Appl. No.: 18/975,065

(22) Filed: Dec. 10, 2024

(65) Prior Publication Data

US 2025/0100017 A1 Mar. 27, 2025

Related U.S. Application Data

(63) Continuation of application No. 18/133,467, filed on Apr. 11, 2023, now Pat. No. 12,202,010.

(60) Provisional application No. 63/329,653, filed on Apr. 11, 2022.

(51) Int. Cl.
*B07B 13/04* (2006.01)
*B01J 4/00* (2006.01)
*B07B 13/16* (2006.01)

(52) U.S. Cl.
CPC ............... *B07B 13/04* (2013.01); *B01J 4/007* (2013.01); *B07B 13/16* (2013.01)

(58) Field of Classification Search
CPC ........... B07B 13/04; B07B 13/16; B01J 4/007
USPC .......................................................... 209/258
See application file for complete search history.

(56) References Cited

U.S. PATENT DOCUMENTS 6,500,336 B1 * 12/2002 Gneuss ............... B29C 48/6912 210/236
2009/0250411 A1 * 10/2009 LaCour .................. B01D 35/02 210/151
2010/0264243 A1 * 10/2010 Blickley ................ B07B 13/16 209/262
2011/0302889 A1 * 12/2011 Boothe ..................... B29B 9/16 53/513
2014/0171611 A1 * 6/2014 Nyfors ..................... B01J 8/003 422/131

* cited by examiner

*Primary Examiner* — Molly K Devine
(74) *Attorney, Agent, or Firm* — Osha Bergman Watanabe & Burton LLP

(57) ABSTRACT

A system for removing particle agglomerates from a particulate product stream. The system including a product stream inlet configured for receiving the particulate product stream, a diverter system configured for permitting a particulate product having a size less than or equal to a desired size to pass through the diverter system, a carrying fluid source connected to the diverter system configured to feed a carrying fluid into the diverter system to carry the particle agglomerate out of the diverter system during a discharge operation, a collector vessel connected to the diverter system, the collector vessel configured for receiving the particle agglomerate carried out by the carrying fluid from the diverter system during the discharge operation, and a particulate product outlet connected to the diverter system, the particulate product outlet configured for conveying the particulate product to a downstream process.

17 Claims, 5 Drawing Sheets

LUMPS DISCHARGE SYSTEM

BACKGROUND

In the production of particulate or granular products, such in the formation of polymer particulates or granules, there can be an unintentional formation of agglomerates, also referred to as lumps, sheets, or synthesized polymer particles for a variety of reasons. For example, within a reactor, there may be hot spots that are generated that result in such lump formation.

In gas phase polymerization, electrostatic charges and forces on the reactor walls may result in catalyst and resin particles tending to adhere to the reactor walls. With fairly long residence times of the polymers in a reactive environment, a temperature excess may cause particles to melt with the resulting formation of sheets or layer of thin molten agglomerates in the granular product.

Lumps in the product result in a nonuniform size product and lumps inside the reactor vessel can result in stoppage of the process, such as by preventing reactor bed circulation or by blocking the discharge of the reactor, thereby requiring cleaning of the reactor vessel before the process can be continued. This can be quite costly and time consuming.

Accordingly, there exists a continuing need to reduce the negative effect of lumps that form during the production of a particulate or granular product.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for removing, or discharging, particle agglomerates from a particulate product stream. The system including a product stream inlet configured for receiving the particulate product stream, a diverter system connected to the product stream inlet and configured for permitting a particulate product having a size less than or equal to a desired size to pass through the diverter system and temporarily retaining a particle agglomerate having a size greater than the desired size in the diverter system, a carrying fluid source connected to the diverter system configured to feed a carrying fluid into the diverter system to carry the particle agglomerate out of the diverter system during a discharge operation, a collector vessel connected to the diverter system, the collector vessel configured for receiving the particle agglomerate carried out by the carrying fluid from the diverter system during the discharge operation, and a particulate product outlet connected to the diverter system, the particulate product outlet configured for conveying the particulate product to a downstream process.

In another aspect, embodiments disclosed herein relate to a process for removing, or discharging, particle agglomerates from a particulate product stream. The process including feeding a particulate product stream into a diverter system. The process further including conveying the particulate product stream through a particulate product outlet to a downstream process and monitoring a change in process conditions that indicates a particle agglomerate retention in the diverter system. The diverter system being configured for concurrently permitting the particulate product having a size less than or equal to a desired size to exit the diverter system and retaining one or more particle agglomerates having a size greater than the desired size in the diverter system. When the change in process conditions achieves a predetermined level, the process further includes actuating the diverter system from a regular flow position to a particle agglomerate discharging position, dislodging the particle agglomerate retained in the diverter system using a carrying fluid from a carrying fluid source, and conveying the dislodged particle agglomerate into a collector vessel.

Other aspects and advantages of the claimed subject matter will be apparent from the following description and the appended claims.

DETAILED DESCRIPTION

Generally, embodiments disclosed herein relate to a system for removing, or discharging, particle agglomerates (also referred to as a lumps discharge system) that may be incorporated into any system or process involving a particulate product where agglomerates are formed. For example, such system and process may involve a polymerization reactor or process, and in particular a gas phase polymerization, but is not so limited as it has applicability in any part of a plant such as a polymerization plant where agglomerate removal is needed.

For example, conventional gas phase fluidized bed reactors comprise an elongated reactor body generally having a vertical central axis. The monomers are polymerized in a fluidized bed above a fluidization grid located in the bottom end of the reactor body. A gaseous stream containing monomer (and optionally alpha-olefin comonomer(s)), hydrogen, and inert gas(es) are introduced to the bottom of the bed through the fluidization grid. Active catalyst is introduced into the bed, either as a fresh catalyst or as polymer particles from a prior polymerization stage. Unreacted gas is collected from the top of the bed, cooled and recycled to the bottom of the reactor. Polymer product is withdrawn from the lower part of the reactor, with no limitation on the type of reactor discharge configurations. For example, in one or more embodiments the lumps discharge system may be used in conjunction with a gas phase, descending bed as described. In other embodiments, the lumps discharge system may be associated with any reactor or process in which agglomerates are removed from a solids stream. In some embodiments, the lumps discharge system may not be associated with the primary reactor, but instead associated with some other process component in which there is a stream of solids that flows. Thus, the lumps discharge system has wide applicability to any process that has flow. While not desired, lumps or agglomerates of polymer product may form for a variety of reasons, and thus, embodiments of the present disclosure seek to provide a mechanism by which such lumps or agglomerates may be separated from the desirable polymer particulates or granules.

Figure 1:
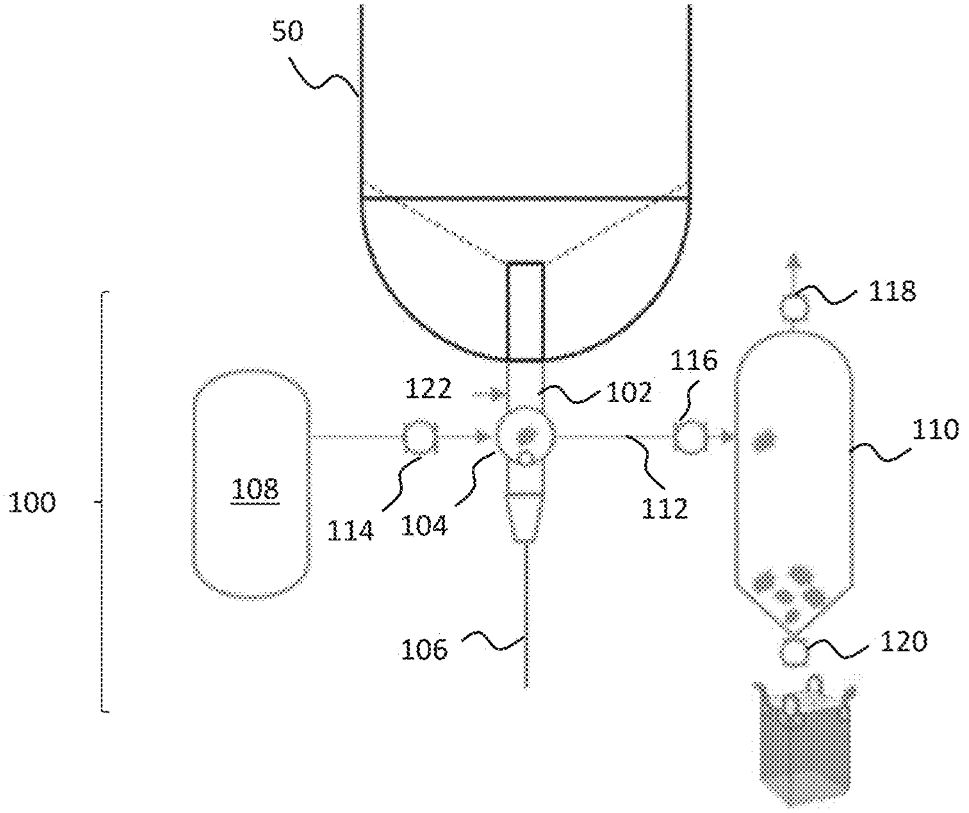
FIG. 1 is a system for removing, or discharging, particle agglomerates according to one or more embodiments disclosed herein.

Referring now to FIG. 1, an exemplary implementation of a system for removing, or discharging, particle agglomerates (also referred to as lumps discharge system) with a gas phase reactor is shown. Specifically, as shown a lumps discharge system 100 is connected to a vessel 50 (specifically, as illustrated a polymerization reactor, and in particular a gas phase reactor). Lumps discharge system 100 may include a product stream inlet configured for receiving the particulate product stream. The particulate product stream may include desirably sized particulates and undesirably sized agglomerates or lumps (such as polymer granules and polymer lumps, respectively). In embodiments where the lumps discharge system is associated with polymerization, the desired sized particles may be from 0.05 mm to 10 mm in diameter, or from 0.1 to 5 mm in diameter. Undesirable sized particles may have a diameter greater than 5 mm, such as greater than 10 mm. However, it is appreciated that given the wide applicability of the presently described lumps discharge system, the desired sized particles and the undesirable agglomerates may have other size ranges. Such product stream inlet 102 may allow for the lumps discharge system 100 to receive product directly from a vessel 50, or may include a pipe (as shown) or valve through which product flows into lumps discharge system 100. After a particulate product stream passes through the product stream inlet 102, it flows to a diverter system 104 connected to the product stream inlet 102 and configured for permitting a particulate product having a size less than or equal to a desired size to pass through the diverter system and temporarily retaining a particle agglomerate having a size greater than the desired size in the diverter system. Particulate product having a size less than or equal to the desired size may flow to a particulate product outlet 106 connected to the diverter system 104, the particulate product outlet 106 being configured to convey the particulate product to a downstream process. Specific embodiments of diverter system 104 in operation are shown in FIGS. 2A-2C and 3A-3C.

Returning to the diverter system 104, when a particle agglomerate enters and is retained by the diverter 104, the lumps discharge system 100 operates to remove the retained particle agglomerates therefrom. The diverter 104 is actuated, as discussed in greater detail below, thereby stopping the flow of particulate product stream into the diverter 104 so that the diverter 104 can be operated to remove the particle agglomerate therefrom. Once diverter 104 is actuated, a carrying fluid is fed to the diverter 104 from a fluid source 108 such that the carrying fluid carries the particle agglomerate out of the diverter system 104 during a removal operation. Specifically, the carrying fluid carries the particle agglomerate to a collector vessel 110 (configured to collect particle agglomerates) connected to the diverter system, such as through a diverter outlet line 112. In particular embodiments, in order to optimize a fast blowing of the particle agglomerate, the carrying fluid source 108 may be positioned opposite the collector vessel 110.

Carrying fluid may be a liquid or a gas (including inert or non-inert fluids) that is designed to carry the agglomerate out of the diverter 104 and into collector vessel 110. Examples of inert and non-inert fluids include nitrogen and ethylene, respectively. In order to effectively remove the particle agglomerate, the pressure of carrying fluid should be high enough to make it in a fast blow. The pressure, flow rate, or both, may depend on factors such as agglomerate size, pipe diameter, distance to travel, and agglomerate density.

Moreover, as illustrated, discharge system 100 also includes at least one valve 114, between the carrying fluid source 108 and the diverter 104, that allows carrying fluid to flow through diverter 104 during a lump discharge operation but which is closed when the discharge system 100 is not performing a lump discharge operation. Optionally, system 100 may also include a second valve 116 that is between diverter 104 and collector vessel 110 to allow for the passage of particle agglomerate into the collector vessel 110 during a lump discharge operation and/or to prevent backflow of any materials into diverter when the collector vessel is emptied. In one or more embodiments, during polymerization operations, the second valve 116 may be in an open position, and left in an open position during periods where particle agglomerate is discharged to collector vessel 110. When the collector vessel 110 is to be emptied, the second valve 116 may be closed to prevent particle agglomerates in collector vessel 110 from re-entering the diverter 104 or re-entering processes components upstream of diverter 104. Such valves 114, 116 may include but are not limited to gate valves, ball valves, slide valves, check valves, or any other such valve that allows for automatic or manual one way travel. Valve 114 in particular may be a quick opening valve so as to allow for the sudden fast blow of an agglomerate retained within diverter 104 into collector vessel 110

Collector vessel 110 receives a mixture of carrying fluid and particle agglomerates, and thus may include a carrying fluid-particle agglomerate segregation system. The type of carrying fluid-particle agglomerate system may depend on the type of carrying fluid used. In one or more embodiments, the carrying fluid may be gas or liquid. In such embodiments, the segregation system may be a cyclonic-separator type separator vessel. Once the carrying fluid and the particle agglomerate are separated from each other, the carrying fluid and particle agglomerate may each be separately discharged from collector vessel 110 via a carrying fluid outlet 118 and a particle agglomerates outlet 120. For example, when the carrying fluid is a gas, carrying fluid outlet 118 may discharge to a flare. In embodiments where the carrying fluid is a liquid, the carrying fluid outlet 118 may discharge to a knockout vessel in order to reduce pressure, velocity, and separate entrained gas from the bulk flow liquid. Further, it is also envisioned that the collector vessel 110 includes an impact absorption system. The impact absorption system may be used to deaccelerate the removed agglomerates, thereby avoiding damage to the collector vessel. The impact absorption system may include one or more of a tangential entrance of the agglomerate to the collector vessel 110 and a reinforced wall opposite the agglomerate inlet. In one or more embodiments, lumps discharge system 100 may also include a flushing inlet 122 located upstream the diverter 104. The flushing inlet 122 is configured to feed an inert cooling fluid (liquid or gas) upstream of the diverter 104 during the particle agglomerate removal, or discharge, operation. Examples of the inert cooling fluid may include, but are not limited to, nitrogen, and C2-C18 alkanes, such as propane. In embodiments where the lumps discharge system is connected to a polymerization reactor, such inert cooling fluid may operate to cool down the reduce or prevent polymerization at the vessel 50 discharge and/or in product stream inlet 102 while the diverter 104 is in a lumps discharge operation. The flushing inlet 122 and inert cooling fluid may be particularly used in embodiments using the diverter 104 discussed in FIG. 2 below. Further, in addition to a flushing inlet 122, it is also envisioned that a vent (not shown) may optionally be included to purge the space between the diverter body and its blocking device.

In use, a particulate product stream may be fed into a diverter system 104, the diverter system 104 being configured for concurrently: permitting the particulate product having a size less than or equal to a desired size to exit the diverter system 104, and retaining one or more particle agglomerates having a size greater than the desired size in the diverter system. The particulate product may be conveyed through a particulate product outlet 106 to a downstream process. A change in process conditions may be monitored to indicate a particle agglomerate has been retained in the diverter system 104. When the change in process conditions achieves a predetermined level, the diverter system 104 may be actuated from a regular flow position to a particle agglomerate discharging position. Then, the particle agglomerate retained in the diverter system 104 may be dislodged using a carrying fluid from a carrying fluid source 108, and the dislodged particle agglomerate may be conveyed into a collector vessel 110. Further, the process may also include opening a first valve intermediate the carrying fluid source and the diverter system before dislodging the particle agglomerate so that the carrying fluid may blow the particle agglomerate out of the diverter system 104. Before actuating the diverter system 104 back to the regular flow direction, the first valve may be closed.

Figures 2A, 2B, 2C:
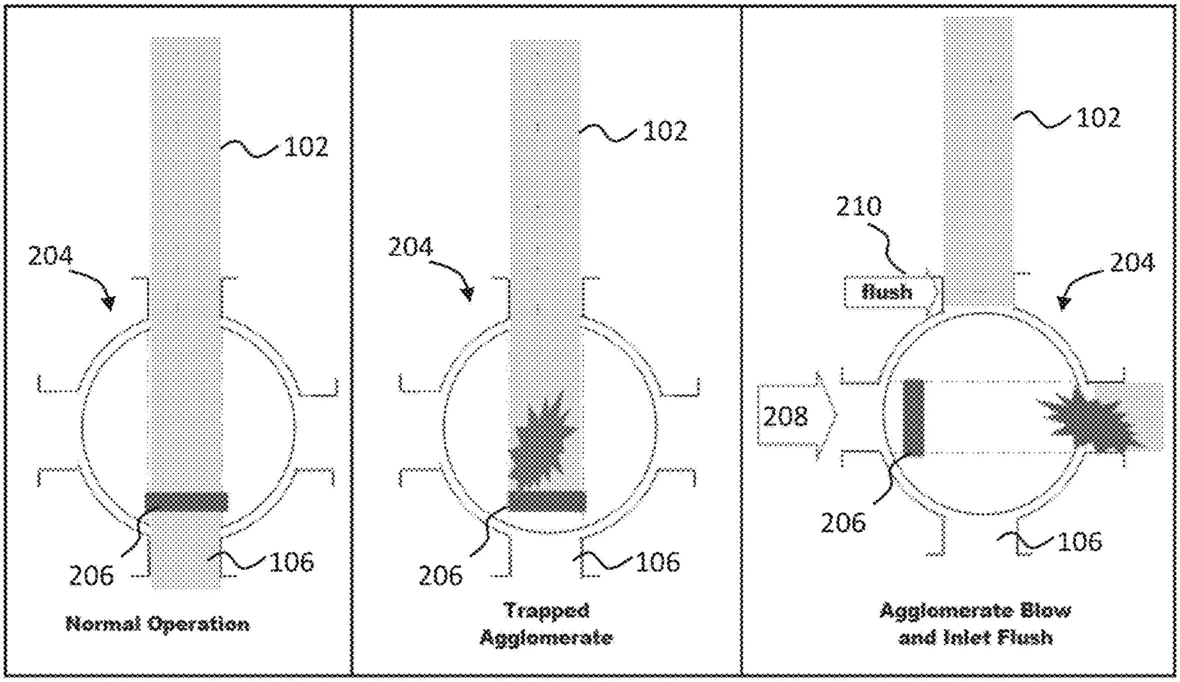
FIGS. 2A-2C shows a diverter system according to one or more embodiments disclosed herein.

Referring now to FIGS. 2A-2C, an embodiment of a diverter system 104 (shown in FIG. 1) is shown. As shown in FIGS. 2A-2C, diverter system 104 (shown in FIG. 1) includes an actuatable valve, specifically a four-way ball valve 204. Four-way ball valve 204 is actuatable to first be opened to allow for the passage of particulate product having a size less than or equal to a desired size to pass from the product inlet valve 102 through the valve 204, and into the product outlet 106. Four-way ball valve 204 includes a trap 206 that retains particle agglomerates but allows particles of smaller size to pass through when the valve 204 is in normal operation, as shown in FIG. 2A. When the valve is in this first position, particle agglomerates (larger than the desired particulate product size) are retained within diverter 104, as shown in FIG. 2B, by trap 206. Upon particle agglomerates being retained, the four-way ball valve 204 is actuated to stop the flow of particulate product stream therethrough and, allow for a carrying fluid 208 to remove the retained particle agglomerate therefrom, as shown in FIG. 2C. Moreover, as mentioned above, when a four-way ball valve is used in diverter system 104 (shown in FIG. 1) used in a polymerization process, a cooling flushing inert fluid 210 may be provided to the product inlet 102 to stop polymerization therein between monomers and/or the polymer product while diverter is in an agglomerate discharge operation. After a particle agglomerate discharge operation is conducted, the four-way ball valve 204 may return to the position illustrated in FIG. 2A.

As mentioned, four-way ball valve 204 includes trap 206. In one or more embodiments, trap 206 includes one or more retention bars within four-way ball valve 204 and configured for permitting the particulate product having a size less than or equal to the desired size to exit the four-way ball valve 204 and retaining the particle agglomerate having a size greater than the desired size therein.

When four-way ball valve 204 is actuated, it alternates, by rotation between having a product inlet-product outlet throughpass and a carrying fluid-collector vessel throughpass, In order for the particle agglomerates to be able to be trapped in the ball valve 204 from the particle product stream flowing from the product inlet 102 to product outlet 106 and then exit the ball valve by being carried by carrying fluid to the collector vessel (not shown), the one or more retention bars may be oriented in one or more embodiments to be substantially parallel to the direction of rotation. As used herein substantially parallel may be within ±10 degrees from the direction of rotation. Advantageously, use of substantially oriented parallel bars may reduce the mechanical loads on the parts, thereby reducing risk of bar breakage. However, it is also envisioned that other, non-substantially parallel orientations may be used, including substantially perpendicular to the direction of rotation, which is within ±10 degrees from perpendicular to the direction of rotation.

Further, as mentioned above, it is desirable to prevent open communication between vessel 50 (such as a polymerization reactor), product inlet 102, or both. Such open communication may result in discharge of an uncontrolled amount of polymer and gas from the vessel to the lumps discharge system, disturbing the reaction and plugging the lumps discharge system. Thus, in one or more embodiments, to ensure that the ball valve 204 is sized to prevent such communication, the four-way ball valve may have a bore inside diameter (ID) smaller than 35% of the sphere diameter (SD): $ID<0.35*SD$. Such sizing may be sufficient to substantially avoid a crossflow where, during a portion of the rotation of the ball valve the product inlet 102 and the collector vessel inlet are in direct fluid communication.

In use, when a particle agglomerate is detected in the four-way valve 204, the diverter system 104 is actuated to a particle agglomerate discharging position by rotating the 4-way ball valve by 90 degrees, and the actuating the diverter system back to the regular flow position comprises rotating the 4-way ball valve backward by 90 degrees. Further, as the four-way valve 204 is actuated, an inert cooling fluid may be flushed upstream of the diverter system 104, which may be stopped after actuating the diverter system 104 back to the regular flow position. In embodiments using the four-way valve where an optional vent is included to purge the space between the diverter body and its blocking device, such space between the diverter body and the blocking device is the clearance between the valve body and the sphere of a ball valve.

Figure 3A:
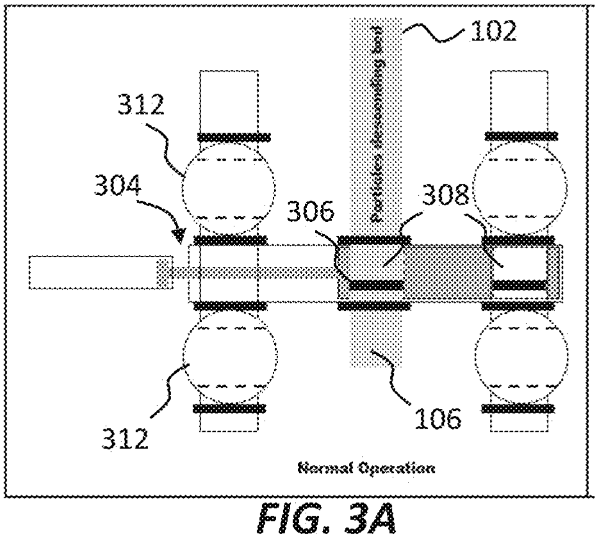
FIGS. 3A-3C shows a diverter system according to one or more embodiments disclosed herein.
Figure 3B:
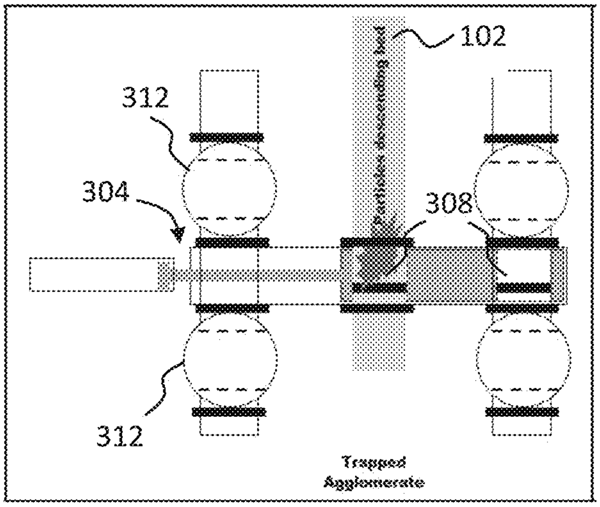
Figure 3C:
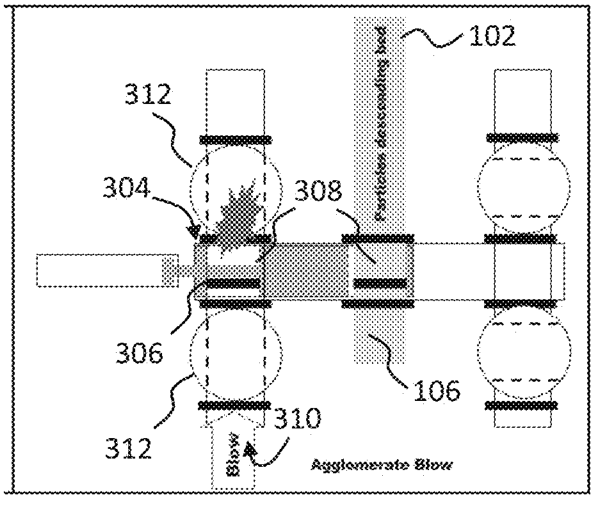
Figure 4:
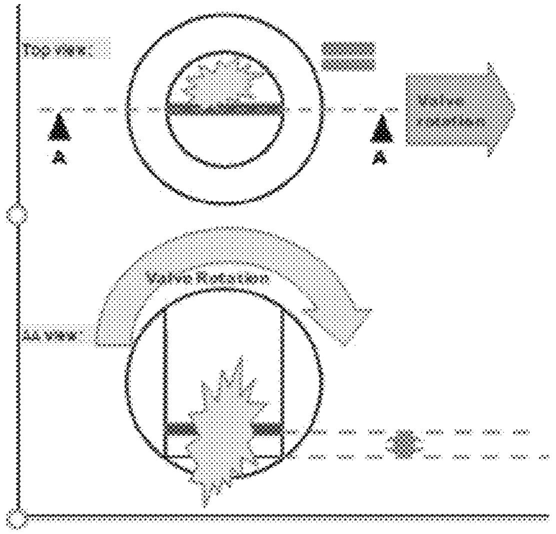
FIG. 4 shows direction of movement of the valve in the diverter system of FIGS. 2A-2C according to one or more embodiments disclosed herein.

Referring now to FIGS. 3A-3C, another embodiment of a diverter system 104 is shown. As shown in FIGS. 3A-3C, diverter system 104 includes an actuatable valve, specifically a slide valve 304. In one or more embodiments, the slide valve possesses at least two positions, if not more, and a corresponding number of orifices therein. Slide valve 304 is actuatable to first be opened to allow for the passage of particulate product having a size less than or equal to a desired size to pass from the product inlet 102 through an orifice in valve 304, and into the product outlet 106. Slide valve 304 includes a trap 306 that retains particle agglomerates in the orifice but allows particles of smaller size to pass through when the valve 304 is in normal operation, as shown in FIG. 3A. As illustrated, slide valve 304 includes two orifices 308, with a trap 306 being contained in each. When the valve 304 is in this first position, particle agglomerates (larger than the desired particulate product size) are retained within slide valve 304, as shown in FIG. 3B, by trap 306. Upon particle agglomerates being retained, the slide valve 304 is actuated to stop the flow of particulate product stream through the orifice 308 with the particle agglomerate and instead, allow for a carrying fluid 310 to remove, or discharge, the retained particle agglomerate therefrom, as shown in FIG. 3C. After a particle agglomerate discharge operation is conducted, the slide valve 304 may return to the position illustrated in FIG. 3A, or if trap 306 is included in each valve orifice 308 of the slide valve 304 (as illustrated), then the slide valve 304 may optionally stay in the position illustrated in FIG. 3C when particulate product stream resumes flow through a different orifice 308 than the preceding step. In such latter embodiment, there may be multiple discharge pipes (and carrying fluid feeds) so that the slide valve 304 can be emptied to collector vessel in either slide position. Further, when the slide valve 304 includes two orifices 308 with a trap 306 in each, the particle agglomerate discharge process only results in a brief process flow interruption, during the movement of the valve 304. Once the slide valve 304 aligns the second orifice 308, the process flow goes on, while the particle agglomerate removal takes place in the first orifice. Further, inclusion of valves 312, such as block valves, may be actuated to allow for the carrying fluid 310 to blow from carrying fluid source (not shown) to collector vessel (not shown), blowing the agglomerate retained by trap 306 to collector vessel (not shown). When two orifices 308 are present, valves 312 may allow for use each of the discharge pipes.

As mentioned, slide valve 304 includes trap 306. In one or more embodiments, trap 306 includes one or more retention bars within slide valve 304 and configured for permitting the particulate product having a size less than or equal to the desired size to exit the slide valve 304 and retaining the particle agglomerate having a size greater than the desired size therein.

In use, actuating the diverter system 104 to a particle agglomerate discharging position involves sliding the slide valve 304 by a predetermined length so that the particulate product stream is conveyed from a first orifice to a second orifice. In embodiments using the slide valve where an optional vent is included to purge the space between the diverter body and its blocking device, the space between the diverter body and the blocking device is the clearance between the valve body and the sliding metal block.

Figure 5:
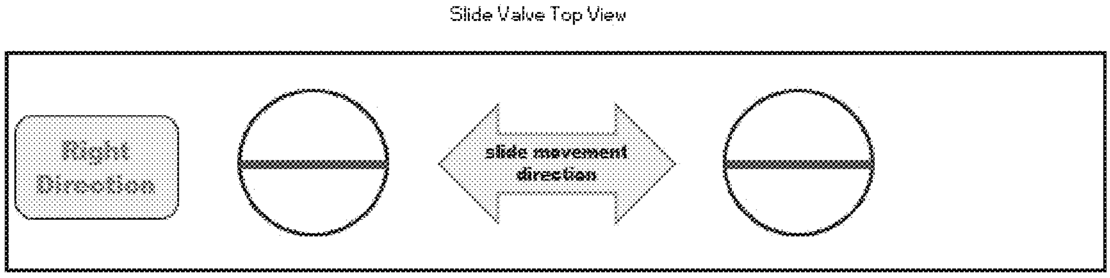
FIG. 5 shows direction of movement of the valve in the diverter system of FIGS. 3A-3C according to one or more embodiments disclosed herein.

When slide valve 304 is actuated, it alternates, by sliding between having a product inlet-product outlet throughpass and a carrying fluid-collector vessel throughpass, In order for the particle agglomerates to be able to trapped in the slide valve 304 from the particle product stream flowing from the product inlet 102 to product outlet 106 and then exit the slide valve by being carried by carrying fluid to the collector vessel (not shown), the one or more retention bars may be oriented in one or more embodiments to be substantially parallel to the direction of the slide. As used herein substantially parallel may be within ±10 degrees from the direction of the slide. Advantageously, use of substantially oriented parallel bars may reduce the mechanical loads on the parts, thereby reducing risk of bar breakage. However, it is also envisioned that other, non-substantially parallel orientations may be used, including substantially perpendicular to the direction of the slide and substantially perpendicular may be within ±10 degrees from perpendicular to the direction of the slide. Such direction of movement is shown in FIG. 5.

As mentioned above, the reactor atmosphere and the descending bed cannot have open communication with the lumps purging and discharging system. This communication would discharge uncontrolled amount of polymer and gas from the gas phase reactor to the lumps discharge system, disturbing the reaction and plugging the lumps discharge system. Thus, in order to avoid the described uncontrolled discharge, the space between orifices of the slide valve must be bigger than the bore inside diameter. Such sizing may be sufficient to substantially avoid a crossflow.

It is envisioned that either four-way ball valve 204 or slide valve 304 may receive a particle agglomerate that is larger than the valve's sphere diameter or the slide height. In such instances, the valve 204, 304 may need to cut the product agglomerate, which may be achieved through one or more of: cutting edges on the valve body and the sphere or slide, including the sealing material; high torque or strength actuator; double action actuator, to avoid having the spring resistance against the piston action. Thus, in one or more embodiments, the valve movement cuts the particle lump that are oversized.

Figure 6:
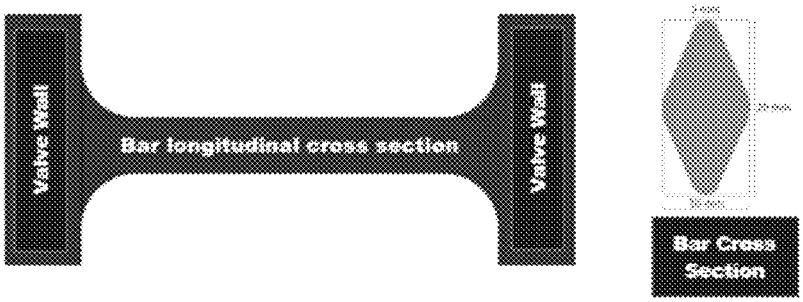
FIG. 6 shows an example retention bar according to one or more embodiments disclosed herein.

Retention bars are discussed above as being a part of trap 206, 306. In particular embodiments, one or more of the retention bars have a teardrop shaped cross section, a circular cross section, a diamond shaped cross section or combinations thereof. For example, a diamond shaped cross section is illustrated in FIG. 6 Moreover, trap 206, 306 may include one retention bar or multiple retention bars. When multiple retention bars are used, a plurality of retention bars may be arranged substantially parallel to each other, or a substantially perpendicular grid may be formed.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112 (f) for any limitations of any of the claims, except for those in which the claim expressly uses the words "means for" or "step for" together with an associated function.

What is claimed is:

1. A system for removing particle agglomerates from a particulate product stream, the system comprising:
- a product stream inlet configured for receiving the particulate product stream;
- a diverter system connected to the product stream inlet and configured for permitting a particulate product having a size less than or equal to a desired size to pass through the diverter system and temporarily retaining a particle agglomerate having a size greater than the desired size in the diverter system;
- a carrying fluid source connected to the diverter system configured to feed a carrying fluid into the diverter system to carry the particle agglomerate out of the diverter system during a discharge operation;
- a collector vessel connected to the diverter system, the collector vessel configured for receiving the particle agglomerate carried out by the carrying fluid from the diverter system during the discharge operation; and
- a particulate product outlet connected to the diverter system, the particulate product outlet configured for conveying the particulate product to a downstream process, wherein:
- the diverter system comprises a slide valve comprising at least two orifices,
- the slide valve comprises a trap in each of the at least two orifices, and
- the diverter system is configured to:
  - be actuated from a regular flow position to a particle agglomerate discharging position, thereby dislodging the particle agglomerate retained in the diverter system using the carrying fluid from the carrying fluid source, and
  - convey, thereafter, the dislodged particle agglomerate into the collector vessel.

2. The system of claim 1, wherein the slide valve is configured for capturing lumps and removing the lumps from the system.

3. The system of claim 1, wherein the diverter system further comprises a plurality of discharging pipes connected to the slide valve and configured to carry out the particle agglomerate.

4. The system of claim 3, wherein each of the plurality of the discharging pipes comprises a valve.

5. The system of claim 3, wherein the carrying fluid source is a plurality of carrying fluid sources.

6. The system of claim 1, wherein the slide valve comprises one or more retention bars configured for permitting the particulate product having a size less than or equal to the desired size to exit the system and retaining the particle agglomerate having a size greater than the desired size.

7. The system of claim 6, wherein the one or more retention bars have a teardrop shaped cross section, a circular cross section, a diamond shaped cross section, or combinations thereof.

8. The system of claim 6, wherein the one or more retention bars have a teardrop shaped cross section, a diamond shaped cross section, or combination thereof.

9. The system of claim 1, further comprising a flushing inlet located upstream the diverter system, the flushing inlet configured to feed an inert cooling fluid upstream the diverter system during the discharge operation.

10. The system of claim 1, further comprising a first valve located intermediate the carrying fluid source and the diverter system, the first valve being opened during the discharge operation and closed during a time when the system is not in the discharge operation.

11. The system of claim 1, wherein the collector vessel further comprises a carrying fluid-particle agglomerate segregation system, an impact absorption system, a carrying fluid outlet and a particle agglomerates outlet.

12. The system of claim 1, wherein the particulate product stream comprises a polymer, and the system is connected to a gas-phase polymerization reactor.

13. A process for removing particle agglomerates from a particulate product stream, the process comprising:
- feeding a particulate product stream into a diverter system, the diverter system being configured for concurrently:
- permitting the particulate product having a size less than or equal to a desired size to exit the diverter system, and
- retaining one or more particle agglomerates having a size greater than the desired size in the diverter system;
- conveying the particulate product stream through a particulate product outlet to a downstream process;
- monitoring a change in process conditions that indicates a particle agglomerate retention in the diverter system;
- when the change in process conditions achieves a predetermined level, the process further comprises:

actuating the diverter system from a regular flow position to a particle agglomerate discharging position;

dislodging the particle agglomerate retained in the diverter system using a carrying fluid from a carrying fluid source; and conveying the dislodged particle agglomerate into a collector vessel, wherein:

the diverter system comprises a slide valve, and the actuating is conducted before the dislodging and the conveying.

14. The process of claim 13, wherein the slide valve comprises at least two orifices and the actuating the diverter system to a particle agglomerate discharging position comprises sliding the slide valve by a predetermined length so that the particulate product stream is conveyed from a first orifice to a second orifice.

15. The process of claim 14, wherein the dislodging and conveying are conducted simultaneously with the feeding of the particulate product stream into the diverter system.

16. The process of claim 13, further comprising feeding the carrying fluid in the collector vessel to a carrying fluid discharge system.

17. The process of claim 13, further comprising:

opening a first valve before dislodging the particle agglomerate;

closing the first valve before actuating the diverter system back to the regular flow direction; or combinations thereof, wherein the first valve is located intermediate the carrying fluid source and the diverter system.

* * * * *